US012500519B2

(12) United States Patent
Yang et al.

(10) Patent No.: US 12,500,519 B2
(45) Date of Patent: Dec. 16, 2025

(54) SWITCHING DC-TO-DC CONVERTER

(71) Applicant: Richtek Technology Corporation, Zhubei (TW)

(72) Inventors: Shei-Chie Yang, Taichung (TW); Yuan-Yen Mai, Taipei (TW); Pao-Hsun Yu, Hsinchu (TW)

(73) Assignee: RICHTEK TECHNOLOGY CORPORATION, Zhubei (TW)

( * ) Notice: Subject to any disclaimer, the term of this patent is extended or adjusted under 35 U.S.C. 154(b) by 201 days.

(21) Appl. No.: 18/585,454

(22) Filed: Feb. 23, 2024

(65) Prior Publication Data
US 2025/0088106 A1 Mar. 13, 2025

(30) Foreign Application Priority Data
Sep. 13, 2023 (TW) ................................. 112134879

(51) Int. Cl.
*H02M 3/158* (2006.01)
(52) U.S. Cl.
CPC .................................... *H02M 3/158* (2013.01)
(58) Field of Classification Search
CPC ............. H02M 1/0006; H02M 1/4225; H02M 3/156–158
See application file for complete search history.

(56) References Cited

U.S. PATENT DOCUMENTS

| | | | | |
|---|---|---|---|---|
| 6,472,857 | B1 * | 10/2002 | Genest | G05F 1/575 323/281 |
| 8,638,077 | B2 * | 1/2014 | Saphon | H02M 3/156 323/282 |
| 8,803,439 | B2 * | 8/2014 | Stamm | H05B 45/3725 315/291 |
| 11,223,276 | B1 * | 1/2022 | Cai | H02M 1/0022 |
| 2003/0016545 | A1 * | 1/2003 | Jutras | H02M 3/1588 363/18 |
| 2005/0275387 | A1 * | 12/2005 | Mitter | H02M 1/15 323/266 |
| 2009/0045788 | A1 * | 2/2009 | Williams | G05F 1/46 323/273 |
| 2010/0141320 | A1 * | 6/2010 | Lin | H03K 5/05 327/198 |
| 2011/0285366 | A1 * | 11/2011 | Huang | H02M 3/156 323/282 |
| 2011/0316500 | A1 * | 12/2011 | Tang | H02M 3/1563 323/268 |

(Continued)

*Primary Examiner* — Jue Zhang
*Assistant Examiner* — Nusrat Quddus
(74) *Attorney, Agent, or Firm* — McClure, Qualey & Rodack, LLP

(57) ABSTRACT

A switching DC-to-DC converter, in which the control circuit of the switch is powered by an adaptively regulated voltage. A voltage regulator that provides the adaptively regulated voltage has a first receiving terminal coupled to an input terminal of the switching DC-to-DC converter, a second receiving terminal coupled to an output terminal of the switching DC-to-DC converter, and a regulated output terminal coupled to the control circuit to provide the adaptively regulated voltage to power the control circuit and thereby to generate a load current. According to the load current, the voltage regulator controls whether to use the output voltage to assist in the generation of the adaptively regulated voltage.

13 Claims, 3 Drawing Sheets

(56) References Cited

U.S. PATENT DOCUMENTS

| | | | | |
|---|---|---|---|---|
| 2013/0335058 | A1* | 12/2013 | Mercer | H02J 1/06 |
| | | | | 323/318 |
| 2014/0119058 | A1* | 5/2014 | Chou | H05B 45/3725 |
| | | | | 363/16 |
| 2014/0132182 | A1* | 5/2014 | Angeles | H05B 45/14 |
| | | | | 315/306 |
| 2015/0002097 | A1* | 1/2015 | Kung | H02J 7/0068 |
| | | | | 320/128 |
| 2015/0061630 | A1* | 3/2015 | Xu | H02M 1/36 |
| | | | | 323/283 |
| 2015/0378378 | A1* | 12/2015 | Zhang | H02M 3/156 |
| | | | | 323/280 |
| 2016/0293106 | A1* | 10/2016 | Seo | G09G 3/20 |
| 2018/0284826 | A1* | 10/2018 | Sautto | H03F 3/45273 |
| 2019/0131863 | A1* | 5/2019 | El Markhi | H02M 3/156 |
| 2020/0084846 | A1* | 3/2020 | Murphy | H05B 45/395 |
| 2021/0384829 | A1* | 12/2021 | Li | H02M 1/088 |
| 2024/0046848 | A1* | 2/2024 | Yun | G09G 3/2092 |
| 2024/0348147 | A1* | 10/2024 | Li | H02M 1/0025 |

* cited by examiner

SWITCHING DC-TO-DC CONVERTER

CROSS REFERENCE TO RELATED APPLICATIONS

This Application claims priority of Taiwan Patent Application No. 112134879, filed on Sep. 13, 2023, the entirety of which is incorporated by reference herein.

BACKGROUND OF THE INVENTION

Field of the Invention

The present invention relates to a switching DC-to-DC converter.

Description of the Related Art

A switching DC-to-DC converter generally uses a switch to adjust its output voltage. The control circuit that drives this switch requires an adequate power supply.

However, the operational voltage of electronic products is getting lower and lower thanks to advances in technology. How to provide stable and adequate power to a control circuit in a way that saves power is an important issue in this technical field.

BRIEF SUMMARY OF THE INVENTION

In the disclosure, an adaptively regulated voltage is generated to power the control circuit of a switch in a switching DC-to-DC converter.

A switching DC-to-DC converter in accordance with an exemplary embodiment of the disclosure receives an input voltage through an input terminal. It then converts the input voltage into an output voltage, and outputs the output voltage through an output terminal. The switching DC-to-DC converter also includes a switch, a control circuit, and a voltage regulator. The switch is configured to adjust the output voltage. The control circuit is configured to control the switch. The voltage regulator has a first receiving terminal coupled to the input terminal of the switching DC-to-DC converter and a second receiving terminal coupled to the output terminal of the switching DC-to-DC converter. The voltage regulator has a regulated output terminal coupled to the control circuit to supply an adaptively regulated voltage to power the control circuit. The adaptively regulated voltage supplies the control circuit to form a load current. Based on the load current, the voltage regulator controls whether to use the output voltage to assist in the generation of the adaptively regulated voltage.

In an exemplary embodiment, when the input voltage is lower than a first critical voltage which depends on the load current, the voltage regulator uses the output voltage to assist in the generation of the adaptively regulated voltage. When the input voltage is not lower than the first critical voltage, the voltage regulator generates the adaptively regulated voltage based on the input voltage without considering the output voltage.

In an exemplary embodiment, the second critical voltage is lower than the first critical voltage. When the input voltage is lower than the second critical voltage, the voltage regulator generates the adaptively regulated voltage based on the output voltage without considering the input voltage. When the input voltage is lower than the first critical voltage but not lower than the second critical voltage, the voltage regulator generates the adaptively regulated voltage based on the input voltage as well as the output voltage.

In an exemplary embodiment, the voltage regulator comprises a first voltage regulating sub-circuit and a second voltage regulating sub-circuit. The first voltage regulating sub-circuit is configured to compare the first feedback voltage with a reference voltage to couple the input voltage to the regulated output terminal according to the results of the comparison between the first feedback voltage and the reference voltage. The second voltage regulating sub-circuit is configured to compare the second feedback voltage with the reference voltage to couple the output voltage to the regulated output terminal according to the results of comparing the second feedback voltage with the reference voltage. The first feedback voltage and the second feedback voltage are divided from the adaptively regulated voltage to make sure that the first voltage regulating sub-circuit takes precedence over the second voltage regulating sub-circuit.

In an exemplary embodiment, the first voltage regulating sub-circuit includes a first transistor of a P-type channel, a first operational amplifier, and a first diode. The first transistor has a source terminal coupled to the input voltage and a drain terminal coupled to an anode of the first diode. the first operational amplifier has a positive input terminal coupled to the first feedback voltage, a negative input terminal coupled to the reference voltage, and an output terminal coupled to a gate terminal of the first transistor. A cathode of the first diode is coupled to the regulated output terminal. The first and second voltage regulating sub-circuits may have similar structures. In an exemplary embodiment, the second voltage regulating sub-circuit includes a second transistor of a P-type channel, a second operational amplifier, and a second diode. The second transistor has a source terminal coupled to the output voltage and a drain terminal coupled to an anode of the second diode. The second operational amplifier has a positive input terminal coupled to the second feedback voltage, a negative input terminal coupled to the reference voltage, and an output terminal coupled to a gate terminal of the second transistor. A cathode of the second diode is coupled to the regulated output terminal. In such a design, the first feedback voltage is lower than the second feedback voltage.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is made for the purpose of illustrating the general principles of the invention and should not be taken in a limiting sense. The scope of the invention is best determined by reference to the appended claims.

To drive electronic components, a voltage converter is required to convert the input voltage into an output voltage that matches the operational voltage level of the electronic components. The voltage converter feeds its output voltage to the electronic components, thereby ensuring that there is adequate power to drive the electronic components.

Many designs use a switching DC-to-DC converter, which generally uses a switch to adjust its output voltage. In particular, a control circuit that controls the switch requires adequate power. In this disclosure, a voltage regulator is proposed for use in a switching DC-to-DC converter to generate an adaptively regulated voltage to power the control circuit. The disclosed voltage regulator has a first receiving terminal coupled to an input terminal of the switching DC-to-DC converter to receive the input voltage, a second receiving terminal coupled to an output terminal of the switching DC-to-DC converter to receive the output voltage, and a regulated output terminal that outputs the adaptively regulated voltage to power the control circuit and thereby to form a load current. According to the load current, the voltage regulator determines whether to use the output voltage to assist in the generation of the adaptively regulated voltage.

Figure 1:
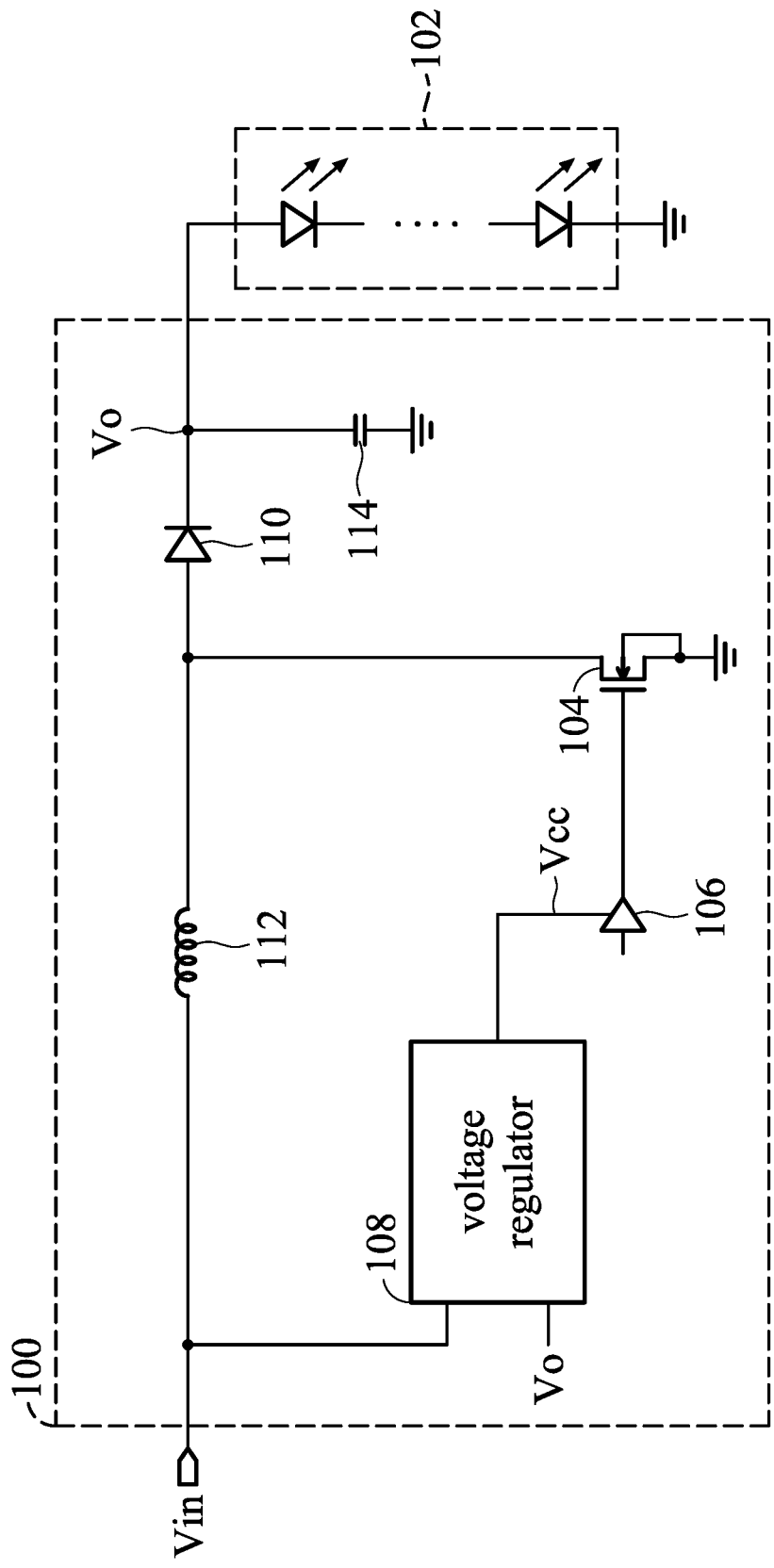
FIG. 1 illustrates a switching DC-to-DC converter 100 in accordance with an exemplary embodiment of the disclosure.

FIG. 1 illustrates a switching DC-to-DC converter 100 in accordance with an exemplary embodiment of the disclosure, which is configured to drive a string of light-emitting diodes 102. The operational voltage required to drive the string of light-emitting diodes 102 may be up to 30V. The switching DC-to-DC converter 100 may be a boost converter, receiving an input voltage Vin via an input terminal, raising the input voltage Vin to an output voltage Vo, and outputting the output voltage Vo via an output terminal (also marked as Vo) to drive the string of light-emitting diodes 102.

As shown, the switching DC-DC converter 100 includes a switch 104, a control circuit 106, and a voltage regulator 108. The voltage regulator 108 has a first receiving terminal coupled to the input terminal (hereinafter also labeled Vin) of the switching DC-to-DC converter 100 and a second receiving terminal coupled to the output terminal Vo of the switching DC-to-DC converter 100. Accordingly, the voltage regulator 108 generates an adaptively regulated voltage Vcc at a regulated output terminal (hereinafter also labeled as Vcc) to be supplied to the control circuit 106. The adaptively regulated voltage Vcc supplies power to the control circuit 106 to form a load current (hereinafter referred to as Io). Based on the load current Io, the voltage regulator 108 determines whether to use the output voltage Vo to assist the gene.

Using this design, if the input voltage Vin is too low (e.g., lower than a lower limit), the voltage regulator 108 uses the output voltage Vo (which is at the higher voltage level) to assist in generating the adaptively regulated voltage Vcc to ensure that the adaptively regulated voltage Vcc is adequate to drive the control circuit 106.

In particular, the voltage regulator 108 does not only check whether the input voltage Vin exceeds a threshold voltage to determine whether to use the output voltage Vo to support the generation of the adaptively regulated voltage Vcc. In response to a light loading of the control circuit 106 (e.g., the load current Io is lower than a threshold), the voltage regulator 108 may disable the assistance of the output voltage Vo even if the input voltage Vin is not high. In such situations, the voltage regulator 108 generates the adaptively regulated voltage Vcc based on the input voltage Vin without the assistance of the output voltage Vo. Therefore, the power consumption of the voltage regulator 108 is reduced, and the adaptively regulated voltage Vcc will not cause overshoot or undershoot due to changes in the input voltage Vin.

This paragraph describes other components of the switching DC-to-DC converter 100. The switching DC-to-DC converter 100 further includes a voltage conversion diode 110, an inductor 112, and a capacitor 114. The voltage conversion diode 110 has a cathode coupled to the output terminal Vo of the switching DC-DC converter 100. The inductor 112 is coupled between the input terminal Vin of the switching DC-to-DC converter 100 and an anode of the voltage conversion diode 110. The capacitor 114 is coupled between the output terminal Vo of the switching DC-to-DC converter 100 and a ground terminal. The switch 104 is an N-channel transistor (NMOS) with a drain terminal coupled to the anode of the voltage conversion diode 110, a source terminal coupled to the ground terminal, and a gate terminal controlled by the control circuit 106. Based on the special design of the voltage regulator 108 in this disclosure, the control circuit 106 is appropriately driven by the adaptively regulated voltage Vcc, and accurately controls the switch 104 to achieve the boost conversion from the input voltage Vin to the output voltage Vo.

Figure 2:
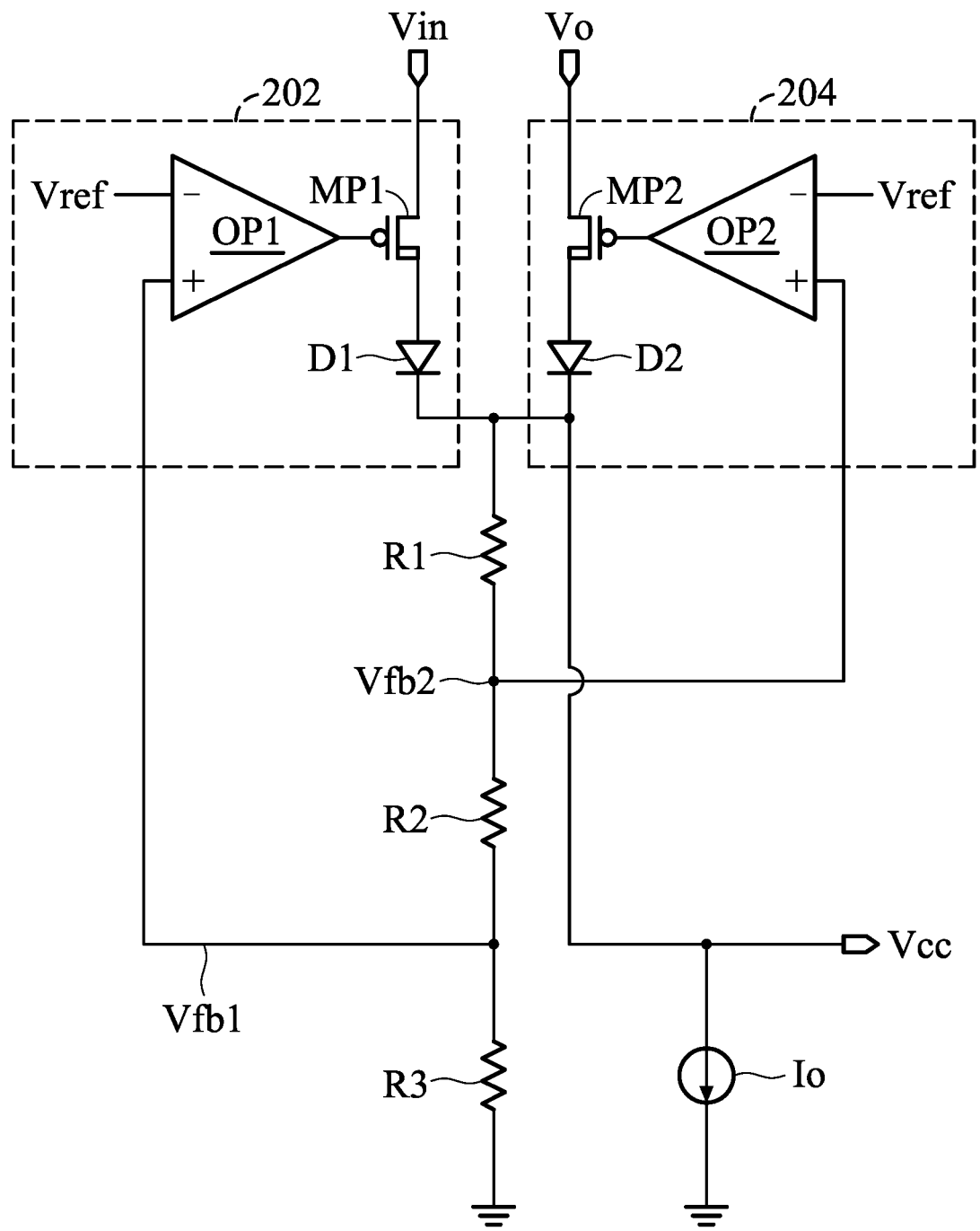
FIG. 2 illustrates the voltage regulator 108 in accordance with an exemplary embodiment of the disclosure.

FIG. 2 illustrates the voltage regulator 108 in accordance with an exemplary embodiment of the disclosure. The voltage regulator 108 includes a first voltage regulating sub-circuit 202 and a second voltage regulating sub-circuit 204. The first voltage regulating sub-circuit 202 compares a first feedback voltage Vfb1 with a reference voltage Vref, to couple the input voltage Vin to the regulated output terminal Vcc according to the comparison result. The second voltage regulating sub-circuit 204 compares a second feedback voltage Vfb2 with the reference voltage Vref, to couple the output voltage Vo to the regulated output terminal Vcc according to the comparison result. The first feedback voltage Vfb1 and the second feedback voltage Vfb2 are two different potentials divided from the adaptively regulated voltage Vcc. According to such a circuit structure, the first voltage regulating sub-circuit 202 has priority over the second voltage regulating sub-circuit 202. Since the first voltage regulating sub-circuit 202 operates based on the input voltage Vin which is much lower than the output voltage Vo used by the second voltage regulating sub-circuit 204, the first voltage regulating sub-circuit 202 consumes much lower power than the second voltage regulating sub-circuit 204. In particular, the voltage regulating sub-circuits 202 and 204 with the same structure make the voltage regulator 108 not simply switching between the input voltage Vin and the output voltage Vo. In some situations, the input voltage Vin and the output voltage Vo may be used as inputs at the same time.

As shown in the figure, the first voltage regulating sub-circuit 202 includes a first transistor MP1 with a P-type channel (PMOS), a first operational amplifier OP1, and a first diode D1. The first transistor MP1 has a source terminal coupled to the input voltage Vin, and a drain terminal coupled to an anode of the first diode D1. The first operational amplifier OP1 has a positive input terminal '+' coupled to the first feedback voltage Vfb1, a negative input terminal '−' coupled to the reference voltage Vref, and an output terminal coupled to a gate terminal of the first transistor MP1. A cathode of the first diode D1 is coupled to the regulated output terminal Vcc.

The second voltage regulating sub-circuit 204 includes a second transistor MP2 with a P-type channel (PMOS), a second operational amplifier OP2, and a second diode D2. The second transistor MP2 has a source terminal coupled to the output voltage Vo, and a drain terminal coupled to an anode of the second diode D2. The second operational amplifier OP2 has a positive input terminal '+' coupled to the second feedback voltage Vfb2, a negative input terminal '−' coupled to the reference voltage Vref, and an output terminal coupled to a gate terminal of the second transistor MP2. A cathode of the second diode D2 is coupled to the regulated output terminal Vcc.

The voltage regulator 108 further includes a first resistor R1, a second resistor R2, and a third resistor R3 connected in series to the regulated output terminal Vcc and a ground terminal. The second feedback voltage Vfb2 is retrieved from the connection node between the first resistor R1 and the second resistor R2. The first feedback voltage Vfb1 is retrieved from the connection node between the second resistor R2 and the third resistor R3. Thus, the first feedback voltage Vfb1 is lower than the second feedback voltage Vfb2. Compared with the second operational amplifier OP2, it is easier for the first operational amplifier OP1 to turn on its transistor (MP1). The first voltage regulating sub-circuit 202 that consumes less power has priority over the second voltage regulating sub-circuit 204. It is power saving.

In an exemplary embodiment, the first resistor R1, the second resistor R2, and the third resistor R3 determines a first ratio R1/(R2+R3). The reference voltage Vref and the first ratio R1/(R2+R3) are designed based on a power supply tolerance of the control circuit 106 to determine a lower voltage limit of the adaptively regulated voltage Vcc.

In an exemplary embodiment, the first resistor R1, the second resistor R2, and the third resistor R3 determines a second ratio (R1+R2)/R3. The reference voltage Vref and the second ratio (R1+R2)/R3 are designed based on a power supply tolerance of the control circuit 106 to determine an upper voltage limit of the adaptively regulated voltage Vcc.

Figure 3:
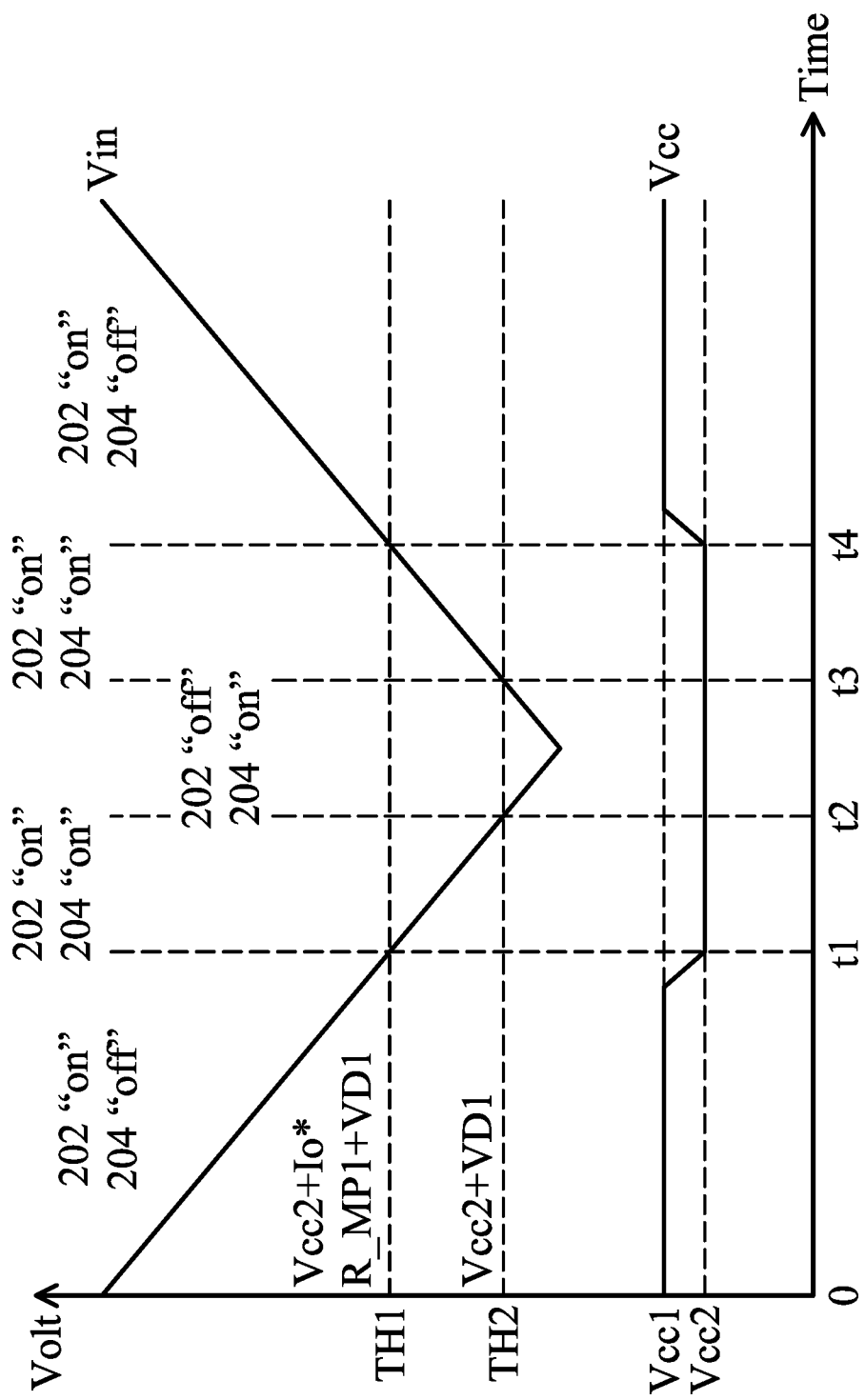
FIG. 3 shows waveforms, in which the adaptively regulated voltage Vcc switches between voltage Vcc1 and voltage Vcc2 while the input voltage Vin changes under the constant load current Io.

FIG. 3 shows waveforms, in which the adaptively regulated voltage Vcc switches between voltage Vcc1 and voltage Vcc2 while the input voltage Vin changes under the constant load current Io. According to the structure of the voltage regulator 108 illustrated in FIG. 2, the load current Io determines a first critical voltage TH1, which is Vcc2+Io*R_MP1+VD1 and is greater than a second critical voltage TH2 (=Vcc2+VD1). R_MP1 is the resistance of the first transistor MP1. VD1 is the voltage across the first diode D1.

From time 0 to t1, before the input voltage Vin drops below the first critical voltage TH1, the first voltage regulating sub-circuit 202 is enabled ("on"), and the second voltage regulating sub-circuit 204 is disabled ("off"). The adaptively regulated voltage Vcc is at a voltage level Vcc1. Refer to the circuit in FIG. 2, Vcc1=Vref*[1+(R1+R2)/R3].

From time t1 to t2, the input voltage Vin is lower than the first critical voltage TH1, but not lower than the second critical voltage TH2. The second voltage regulating sub-circuit 204 is also enabled to help the first voltage regulating sub-circuit 202. The adaptively regulated voltage Vcc is switched to another voltage level Vcc2. Refer to the circuit in FIG. 2, Vcc2=Vref*[1+R1/(R2+R3)], which is lower than the voltage Vcc1.

From time t2 to t3, the input voltage Vin is too low (lower than the second critical voltage TH2). The first voltage regulating sub-circuit 202 is disabled, and the second voltage regulating sub-circuit 204 is fully responsible to keep the adaptively regulated voltage Vcc at Vcc2.

From time t3 to t4, the input voltage Vin rebounds to no less than the second critical voltage TH2, but is still lower than the first critical voltage TH1. Both the first voltage regulating sub-circuit 202 and the second voltage regulating sub-circuit 204 are enabled. The adaptively regulated voltage Vcc is kept at the voltage Vcc2.

After time t4, the input voltage Vin is not lower than the first critical voltage TH1, and the second voltage regulating sub-circuit 204 is no longer needed. The first voltage regulating sub-circuit 202 changes the adaptively regulated voltage Vcc to the voltage level Vcc1.

In FIG. 3, the first voltage regulating sub-circuit 202 and the second voltage regulating sub-circuit 204 are tuned on in a progressive way (or are tuned off in a progressive way). Thus, no overshoot or undershoot is presented at the adaptively regulated voltage Vcc. The first critical value TH1 (=Vcc2+Io*R_MP1+VD1) used to determine whether to enable the second voltage regulating sub-circuit 204 depends on the load current Io. The voltage regulator 108, therefore, is adaptive to the load and is a more flexible design. If the input voltage Vin is really too low (e.g., drops to the fixed second threshold voltage TH2 (=Vcc2+VD1)), the first voltage regulating sub-circuit 202 is disabled. The weak input voltage Vin is not used to power the control circuit 106.

To summarize, when the input voltage Vin is lower than the first critical voltage TH1, the output voltage Vo joins to support the voltage regulator 108 in generating the adaptively regulated voltage Vcc. When the input voltage Vin is not lower than the first critical voltage TH1, the voltage regulator 108 generates the adaptively regulated voltage Vcc only based on the input voltage Vin, without support of the output voltage Vo. When the input voltage Vin is lower than the second critical voltage TH2, the voltage regulator 108 does not generate the adaptively regulated voltage Vcc based on the input voltage Vin, but generates the adaptively regulated voltage Vcc based on the output voltage Vo. When the input voltage Vin is not lower than the second critical voltage TH2, but it is lower than the first critical voltage TH1, then the voltage regulator 108 generates the adaptively regulated voltage Vcc based on both the input voltage Vin and the output voltage Vo.

Using this design in a light loading situation (e.g., the load current Io is low), the first critical value TH1 (=Vcc2+Io*R_MP1+VD1) is low. Even if the input voltage Vin is not high, the control circuit 106 can still be powered normally by the first voltage regulating sub-circuit 202 alone, without the assistance of the second voltage regulating sub-circuit 204.

In the other exemplary embodiments, the voltage regulating sub-circuits may have various designs. Any two sets of similar voltage regulating sub-circuits which operate based on the input voltage Vin and the output voltage Vo respectively can be used to implement the voltage regulator 108 in this case.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A switching DC-to-DC converter, receiving an input voltage via an input terminal, converting the input voltage into an output voltage, outputting the output voltage via an output terminal, and comprising:
   a switch, configured to adjust the output voltage;

a control circuit, configured to control the switch; and
a voltage regulator, having a first receiving terminal coupled to the input terminal of the switching DC-to-DC converter and a second receiving terminal coupled to the output terminal of the switching DC-to-DC converter, and having a regulated output terminal coupled to the control circuit to supply an adaptively regulated voltage to power the control circuit;
wherein:
the adaptively regulated voltage supplies the control circuit to form a load current;
according to the load current, the voltage regulator controls whether to use the output voltage to assist in generation of the adaptively regulated voltage.

2. The switching DC-to-DC converter as claimed in claim 1, wherein:
when the input voltage is lower than a first critical voltage that depends on the load current, the voltage regulator uses the output voltage to assist in the generation of the adaptively regulated voltage.

3. The switching DC-to-DC converter as claimed in claim 2, wherein:
when the input voltage is not lower than the first critical voltage, the voltage regulator generates the adaptively regulated voltage based on the input voltage without considering the output voltage.

4. The switching DC-to-DC converter as claimed in claim 3, wherein:
when the input voltage is lower than a second critical voltage that is lower than the first critical voltage, the voltage regulator generates the adaptively regulated voltage based on the output voltage without considering the input voltage.

5. The switching DC-to-DC converter as claimed in claim 4, wherein:
when the input voltage is lower than the first critical voltage but is not lower than the second critical voltage, the voltage regulator generates the adaptively regulated voltage based on the input voltage as well as the output voltage.

6. The switching DC-to-DC converter as claimed in claim 1, wherein the voltage regulator comprises:
a first voltage regulating sub-circuit, configured to compare a first feedback voltage with a reference voltage to couple the input voltage to the regulated output terminal according to a comparison result between the first feedback voltage and the reference voltage; and
a second voltage regulating sub-circuit, configured to compare a second feedback voltage with the reference voltage to couple the output voltage to the regulated output terminal according to a comparison result between the second feedback voltage and the reference voltage;
wherein:
the first feedback voltage and the second feedback voltage are divided from the adaptively regulated voltage to make the first voltage regulating sub-circuit take precedence over the second voltage regulating sub-circuit.

7. The switching DC-to-DC converter as claimed in claim 6, wherein:
the first voltage regulating sub-circuit includes a first transistor of a P-type channel, a first operational amplifier, and a first diode;
the first transistor has a source terminal coupled to the input voltage and a drain terminal coupled to an anode of the first diode;

the first operational amplifier has a positive input terminal coupled to the first feedback voltage, a negative input terminal coupled to the reference voltage, and an output terminal coupled to a gate terminal of the first transistor; and
a cathode of the first diode is coupled to the regulated output terminal.

8. The switching DC-to-DC converter as claimed in claim 7, wherein:
the second voltage regulating sub-circuit includes a second transistor of a P-type channel, a second operational amplifier, and a second diode;
the second transistor has a source terminal coupled to the output voltage and a drain terminal coupled to an anode of the second diode;
the second operational amplifier has a positive input terminal coupled to the second feedback voltage, a negative input terminal coupled to the reference voltage, and an output terminal coupled to a gate terminal of the second transistor; and
a cathode of the second diode is coupled to the regulated output terminal.

9. The switching DC-to-DC converter as claimed in claim 8, wherein:
the first feedback voltage is lower than the second feedback voltage.

10. The switching DC-to-DC converter as claimed in claim 9, wherein:
the voltage regulator further comprises a first resistor, a second resistor, and a third resistor connected in series from the regulated output terminal to a ground terminal;
the second feedback voltage is taken from a connection node between the first resistor and the second resistor; and
the first feedback voltage is taken from a connection node between the second resistor and the third resistor.

11. The switching DC-to-DC converter as claimed in claim 10, wherein:
the first resistor, the second resistor, and the third resistor determines a first ratio;
the first ratio is R1/(R2+R3), where R1 is resistance of the first resistor, R2 is resistance of the second resistor, and R3 is resistance of the third resistor; and
the reference voltage and the first ratio are designed based on a power supply tolerance of the control circuit to determine a lower voltage limit of the adaptively regulated voltage.

12. The switching DC-to-DC converter as claimed in claim 10, wherein:
the first resistor, the second resistor, and the third resistor determines a second ratio;
the second ratio is (R1+R2)/R3, where R1 is resistance of the first resistor, R2 is resistance of the second resistor, and R3 is resistance of the third resistor; and
the reference voltage and the second ratio are designed based on a power supply tolerance of the control circuit to determine an upper voltage limit of the adaptively regulated voltage.

13. The switching DC-to-DC converter as claimed in claim 1, further comprising:
a voltage conversion diode, having a cathode coupled to the output terminal of the switching DC-to-DC converter;
an inductor, coupled between the input terminal of the switching DC-to-DC converter and an anode of the voltage conversion diode; and a capacitor, coupled between the output terminal of the switching DC-to-DC converter and a ground terminal;
wherein:
the switch is an N-channel transistor having a drain terminal coupled to the anode of the voltage conversion diode, a source terminal coupled to the ground terminal, and a gate terminal controlled by the control circuit.

\* \* \* \* \*